United States Patent
Arjakine et al.

(10) Patent No.: US 9,878,411 B2
(45) Date of Patent: Jan. 30, 2018

(54) DEVICE FOR CLAMPING A TURBINE BLADE

(71) Applicant: SIEMENS AKTIENGESELLSCHAFT, München (DE)

(72) Inventors: Nikolai Arjakine, Berlin (DE); Bernd Burbaum, Falkensee (DE); Roman Kalocsay, Aachen (DE); Andre Mehlhorn, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 129 days.

(21) Appl. No.: 14/760,855

(22) PCT Filed: Jan. 10, 2014

(86) PCT No.: PCT/EP2014/050364
§ 371 (c)(1),
(2) Date: Jul. 14, 2015

(87) PCT Pub. No.: WO2014/108495
PCT Pub. Date: Jul. 17, 2014

(65) Prior Publication Data
US 2015/0352676 A1  Dec. 10, 2015

(30) Foreign Application Priority Data

Jan. 14, 2013 (EP) ..................................... 13151147

(51) Int. Cl.
*B23Q 3/08* (2006.01)
*B23Q 3/06* (2006.01)
(Continued)

(52) U.S. Cl.
CPC .............. *B23Q 3/063* (2013.01); *B23P 6/002* (2013.01); *F01D 5/005* (2013.01); *F01D 5/12* (2013.01);
(Continued)

(58) Field of Classification Search
USPC ....................................... 269/25, 43, 56, 106
See application file for complete search history.

(56) References Cited

U.S. PATENT DOCUMENTS 3,818,646 A      6/1974  Peterson
8,061,699 B2 *  11/2011  Wang ..................... B23Q 3/061
                                                                269/287

(Continued)

FOREIGN PATENT DOCUMENTS

DE       42 37 052 A1    5/1994
DE       100 26 829 A1  12/2001
(Continued)

OTHER PUBLICATIONS

International Search Report dated Feb. 20, 2014 issued in corresponding International patent application No. PCT/EP2014/050364.
Written Opinion dated Feb. 20, 2014 issued in corresponding International patent application No. PCT/EP2014/050364.

*Primary Examiner* — Joseph J Hail
*Assistant Examiner* — Shantese McDonald
(74) *Attorney, Agent, or Firm* — Ostrolenk Faber LLP (57) ABSTRACT

A device for clamping a turbine blade (9) during a welding repair of the blade tip (11). The blade has a peripheral surface that has a suction side (5) and pressure side (7) and has a blade tip. The device has at least one movable clamping structure (1,3) for pressing on the suction side (5) or the pressure side (7) of a turbine blade (9) in the region of the blade tip (11) of the turbine blade, wherein the clamping structure (1,3) is designed to remove heat from the turbine blade (9). The at least one movable clamping struc- (Continued)

ture (1,3) has a plurality of clamping elements (13), which are each individually movably supported in such a way that the clamping elements can be moved toward the peripheral surface of a turbine blade (9) to be clamped and away from the peripheral surface.

13 Claims, 5 Drawing Sheets

(51) Int. Cl.
  *F01D 5/12* (2006.01)
  *F01D 5/00* (2006.01)
  *B23P 6/00* (2006.01)

(52) U.S. Cl.
  CPC ...... *F05D 2220/30* (2013.01); *F05D 2230/80* (2013.01)

(56) References Cited

U.S. PATENT DOCUMENTS

| | | | |
|---|---|---|---|
| 8,186,056 B2 * | 5/2012 | Willis | B23P 6/002 29/889.1 |
| 2011/0215511 A1 * | 9/2011 | Grob | B23Q 1/0009 269/134 |

FOREIGN PATENT DOCUMENTS

| | | | |
|---|---|---|---|
| DE | 10026829 | * 12/2001 | B25B 1/24 |
| EP | 2 228 170 A1 | 9/2010 | |
| FR | 2 956 996 A1 | 9/2011 | |
| JP | H 10 180442 | 7/1998 | |
| MX | 9 606 054 | 4/1998 | |

* cited by examiner

DEVICE FOR CLAMPING A TURBINE BLADE

CROSS-REFERENCE TO RELATED APPLICATIONS

The present application is a 35 U.S.C. §§ 371 national phase conversion of PCT/EP2014/050364, filed Jan. 10, 2014, which claims priority of European Application No. 13151147.9, filed Jan. 14, 2013, the contents of which are incorporated by reference herein. The PCT International Application was published in the German language.

TECHNICAL FIELD

The present invention relates to a device for clamping a turbine blade with a peripheral surface and with a blade tip, wherein the peripheral surface has a suction side and a pressure side, during a welding repair of the blade tip.

Turbine blades are generally produced from superalloys that are able to withstand high temperatures. They often also have a directional grain structure, or are even produced from a single-crystalline material. Turbine blades are correspondingly expensive to produce.

During operation, turbine blades are exposed to corrosive hot gases, which lead to wear of the turbine blades. The wear occurs in particular on the highly stressed portions of the turbine blades, such as the blade tip. There are also turbine blades with so-called friction tips, which serve for sealing off the flow path. During the starting up of a gas turbine system, such friction tips make contact with a sealing ring, which surrounds the turbine rotor carrying the turbine blades, and thereby rub themselves into the material of the sealing ring. However, this not only produces abrasion on the sealing ring, but also on the friction tip.

Since, as stated at the beginning, turbine blades may be very expensive to produce, it is endeavored to refurbish worn turbine blades, so that they can be used once again in a gas turbine. In the course of such a refurbishing process, the original form of the blade tip may have to be recreated. This takes place by build-up welding, i.e. by building up the original form of the friction tip again, in that welding material is applied layer by layer.

In this welding process, which is performed for example by means of laser welding, a considerable heat input into the blade tip takes place. Without suitable countermeasures, this can lead to stresses in the microstructure of the blade material in the region of the blade tip, which impair the quality of the blade tip and thus shorten the possible lifetime of the blade. Moreover, when applying the welding material layer by layer, the layer of welding material previously applied must be cooled down below a certain value before the next layer can be welded on, for which reason the welding process is relatively laborious. It is therefore endeavored to remove the heat introduced into the blade tip, in order to avoid the occurrence of stresses during the welding process and to speed up the welding process.

JP 10180442 describes a method in which build-up welding is performed on a blade tip while a gas or a liquid is conducted through ducts running inside the blade in order to cool the blade during the welding.

DE 42 37 052 A1 describes a device for the repair welding of the blade tips of stationary or movable blades of turbomachines. Mention is made of a device in which the entire main blade part is arrested along the pressure side and the suction side, in the position required for the welding, between jaws that are clamped together in the manner of pincers and that are cooled. The arresting is performed in such that the end of the blade that is to be provided with the build-up weld protrudes slightly from the outer surfaces of the jaws. In DE 42 37 052 A1, it is regarded as a disadvantage that precisely definable cooling does not take place at the entry edge and exit edge of the main blade part, since at these points, the jaws are set to the longest blade.

It is also regarded as a problem that the blades concerned are run down or already used, and have already changed at least slightly in their form to the extent that they only bear against the material of the jaws indeterminately over a more or less large surface area.

Another objection is that the production of the jaws is very complex and the possibility for use is restricted in practice to a quite specific type of compressor or turbine blade if any kind of satisfactory welding result at all is to be achieved. Proceeding from this prior art, DE 42 37 052 A1 therefore proposes that instead of using the clamping jaws which are set appropriately for the suction side and the pressure side, using clamping jaws that have notches which are set appropriately for the entry edge and exit edge of the main blade part and in which the edges of the main blade part engage. One jaw is fixed, and the other jaw is arranged such that it is guided displaceably in the direction of a blade edge. This is intended to achieve uniform cooling at a precisely fixed height at the entry edge and the exit edge. It is stated as a further great advantage of the clamping concept described in DE 42 37 052 A1 that this clamping concept allows a device for repair welding to be used variously for many different blades.

SUMMARY OF THE INVENTION

The object of the present invention is to provide an advantageous device for clamping a turbine blade during a welding repair of the blade tip.

According to the invention, a device for clamping a turbine blade during a welding repair of the blade tip is provided. The turbine blade has a peripheral surface, which has a suction side and a pressure side, and also has a blade tip. The device according to the invention has at least one movable clamping structure for pressing against the suction side or the pressure side of a turbine blade in the region of its blade tip. The clamping structure is configured for removing heat from the turbine blade. The at least one movable clamping structure has a plurality of clamping elements, which are respectively mounted in an individually movable manner, such that they can be moved at least in the direction toward and away from the peripheral surface of a turbine blade to be clamped.

In an advantageous configuration of the device according to the invention, there are both a clamping structure for pressing against the suction side of the peripheral surface and a clamping structure for pressing against the pressure side of the peripheral surface. Each of the movable clamping structures has a plurality of clamping elements, which are respectively individually mounted in a movable manner, such that they can be moved in directions toward and away from the peripheral surface of a turbine blade to be clamped.

That the clamping structure(s) can be pressed against the suction side and/or against the pressure side of the turbine blade means that a large contact area with respect to the peripheral surface of the turbine blade can be produced, allowing rapid removal of the heat introduced by the welding process. At the same time, the configuration of the clamping structure in the form of a plurality of clamping elements allows the clamping structure to be adapted to the form of the respective peripheral surface. The device according to the invention therefore allows contacting over a large surface area of the peripheral surface of a turbine blade to be welded and at the same time allows adapting of the clamping structure contacting this peripheral surface to turbine blades with differently formed peripheral surfaces, in particular with differently formed suction or pressure sides. Similarly, good contact with the peripheral surface can be ensured even in the case of turbine blades that deviate from their nominal form as a result of wear. Even if, on account of wear, each clamping element does not actually bear against the suction side or pressure side with its entire surface area intended for bearing against the suction side or pressure side, uniform removal of heat is nevertheless possible on account of the plurality of contacts distributed over the suction side or pressure side. On account of the heat removal, more rapid cooling down takes place, whereby the duration of the welding process can be reduced considerably. On account of the high cooling-down rate, better welding results are also obtained.

After many years in operation in a power plant, turbine blades are often individually deformed. If rigid cooling elements formed as a negative impression from the geometry of a new part were pressed against the complex free-form geometry of the surface, they would in each case only bear against it at a few individual points (theoretically at three points). As a result of the formation of a gap between the blade and the cooling element, the cooling performance would in this case be poor, since air as a gas has an insulating effect and interrupts the heat flow. It is therefore advantageous within the scope of the invention if each of the clamping elements has in addition to the degree of freedom of translational movement in the direction toward and away from the peripheral surface of a turbine blade to be clamped also two rotational degrees of freedom. In this advantageous configuration, the clamping elements come to lie against the blade as small cooling elements that are mounted so as be freely movable in at least the degrees of freedom mentioned, so that they can adapt themselves in their orientation to the surface geometry of the peripheral surface of the blade. Although it may possibly also be the case here that there are three contact points on each clamping element, the air gaps thereby produced are so small that they can be ignored. The sum of the individual contact areas is great enough to remove the heat. In addition to the degrees of freedom mentioned, there may possibly be further degrees of freedom.

The device for clamping a turbine blade may in particular have a pressing device for applying pressure for pressing the at least one movable clamping structure against the peripheral surface of the turbine blade. Such a pressing device may for example have one or more springs acting on the clamping elements. In this case it is advantageous if each clamping element interacts with a dedicated spring. The pressing device may, however, also have a drive, which allows control of the pressing pressure. In this case, the pressing device may have in particular for each clamping element a dedicated actuator for moving the corresponding clamping element. It may be formed hydraulically or pneumatically, with hydraulic or pneumatic actuators, making it possible for each clamping element to be assigned a dedicated hydraulic or pneumatic actuator. The hydraulic or pneumatic pressing device offers the possibility of applying the same fluid pressure to all of the clamping elements by a common hydraulic circuit or pneumatic circuit. All of the clamping elements are pressed against the peripheral surface of the turbine blade with the same pressure, which can be set in a defined manner, without complex control, which in turn is advantageous with regard to the uniform heat removal over the entire contacted peripheral surface of the turbine blade. Alternatively, there is also a possibility of using an electrical pressing device, that is a pressing device with electromechanical actuators, in which each clamping element can be assigned a dedicated electromechanical actuator, for instance an electric motor, in particular a linear motor. Although the control of such a pressing device is more complex to achieve a uniform pressing pressure for all the clamping elements, in return a rapid and individual activation of the pressure of individual clamping elements is however easily possible. Controlling the pressure of individual clamping elements then allows for example an undesired heat gradient occurring in the peripheral surface to be counteracted by individual clamping elements being pressed into place with higher or lower pressure. This controls the heat exchange between the surface and the clamping elements due to the intimacy of the contact with respect to the peripheral surface. This is also possible when there are individual hydraulic or pneumatic circuits for each clamping element.

The clamping elements may be produced from a material having thermal conductivity greater than the thermal conductivity of the material of the peripheral surface of the turbine blade. This avoids a build-up of heat in the clamping elements to ensure good heat removal at all times.

The heat that is absorbed by the clamping elements can be given off by way of a heat sink connected to the clamping elements. A structure of a large surface area, for example cooling ribs, a heat exchanger, etc., come(s) into consideration for instance as a heat sink. The heat sink may be connected with the surroundings or a secondary cooling circuit for dissipating the heat.

The device according to the invention may have at least one housing with a housing interior space designed for passing a cooling fluid through it. The housing comprises a cooling fluid inlet and a cooling fluid outlet. The clamping elements have a portion protruding from the housing interior space in the direction of the blade tip and a portion protruding into the housing interior space. The heat absorbed by the surface can be given off to a cooling fluid flowing through the interior of the housing by way of the part of a clamping element that protrudes into the housing interior space. In this case, there may be a cooling fluid circuit leading through the housing interior and connected to the heat sink. The cooling fluid circuit may also be connected to a secondary cooling fluid circuit by way of a heat exchanger. The cooling fluid may be a cooling liquid, in particular water, or a gas, in particular air. The cooling fluid used may in this case be selected in particular with regard to the required cooling performance. Such a circuit allows the heat sink to be arranged at a greater distance from the clamping elements. If structures of a large surface area are used as heat sinks, they then do not hinder the welding process.

If articulated mounting of the clamping elements is desired, many joints are necessary if it is wished to mount the clamping elements with the degrees of freedom described above. In the case of build-up welding, a hard and finely particulate metal powder is fed in. Only about half of the powder is typically used. The powder that is not used is distributed in the device. As a result, every joint would seize up immediately if it were not suitably sealed off. Therefore, in an advantageous development of the device according to the invention, the housing interior space is encapsulated in the direction of the turbine blade with the aid of an elastic membrane, for example a rubber membrane. The membrane is fixedly connected to the clamping elements, for example by a form fit or a material bond. The membrane in this case divides the clamping elements into the portion protruding from the housing interior space in the direction of the blade tip and the portion protruding into the housing interior space. All of the movable parts of the clamping elements, for example springs or joints, are located in the portion of the clamping elements that protrudes into the housing interior space. With this configuration, all of the movable parts of the clamping elements are in the encapsulated housing interior space, so that they are reliably protected from the finely particulate metal powder. Because of the extreme welding powder atmosphere, no dynamic seals are therefore used in this development, but instead an elastic membrane, such as a rubber membrane, which allows movement of the clamping elements in relation to the blade tip. The sealing effect is therefore not produced by friction between the membrane and the cooling clamping element, which would lead to abrasive wear, but instead the sealing principle is that of a form fit or a material bond. In this case, the degrees of freedom for the movement are provided by way of the elastic deformation of the membrane. At the same time, the elastic membrane may be used as a bearing and guiding element, which allows mounting in up to six degrees of freedom.

Further features, properties and advantages of the present invention are provided by the description that follows of an exemplary embodiment with reference to the accompanying figures.

DESCRIPTION OF EMBODIMENTS

Figure 1:
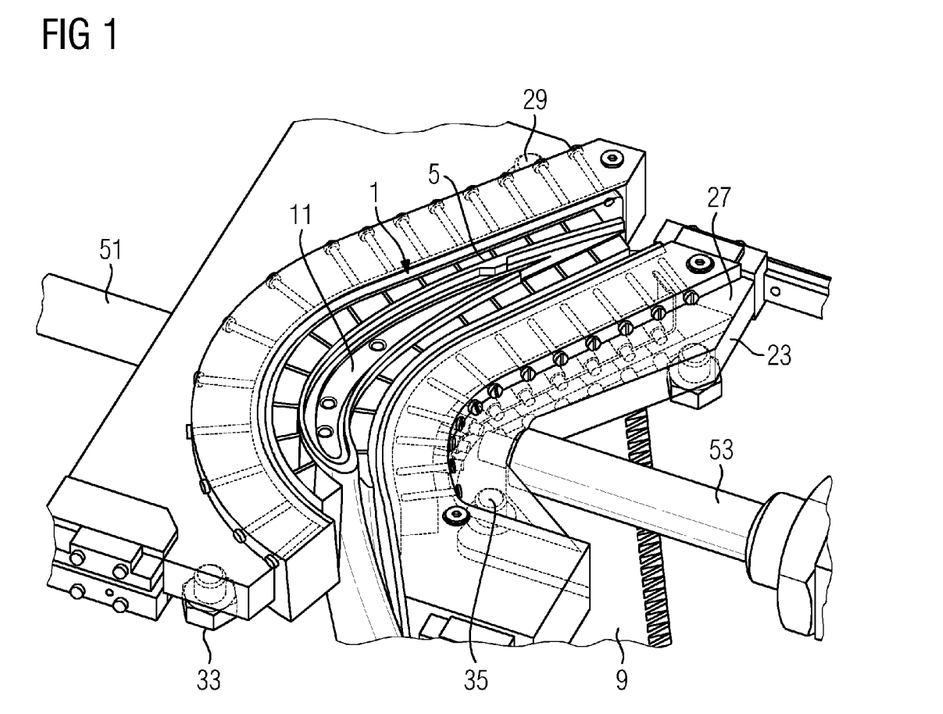
FIG. 1 shows the device according to the invention in a partially transparent representation.

An exemplary embodiment of the device according to the invention for clamping a turbine blade is described hereafter with reference to FIGS. 1 to 4. FIG. 1 shows a perspective view of the device according to the invention. Parts of the device are represented as transparent in order to allow the interior of these parts to be viewed better.

In FIG. 1, the device for clamping a turbine blade comprises two clamping structures 1, 3, which are configured in such a way that they can be pressed against the peripheral surface of a turbine blade 9, specifically against the suction side 5 or against the pressure side 7. During the use of the device, the pressing of the clamping structures 1, 3 against the suction side 5 or against the pressure side 7 of the turbine blade 9 takes place a few millimeters below a blade tip 11 that is intended to be repaired by means of build-up welding. With the aim of the best possible heat removal from the region to be welded, it is desirable to bring the clamping structures as close as possible to the blade tip. The clamping structures are typically placed below the blade tip 11 in the range between 1 and 5 mm.

Figure 2:
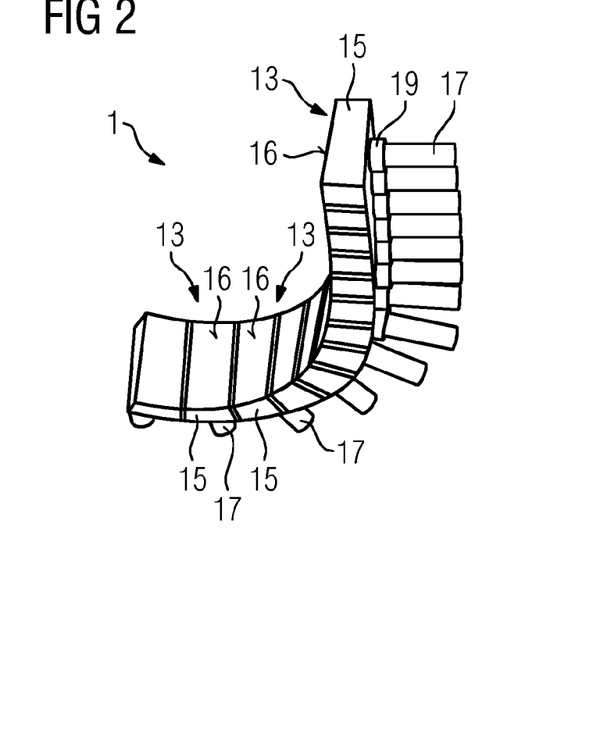
FIG. 2 shows clamping elements that are intended for the suction side of a turbine blade.
Figure 3:
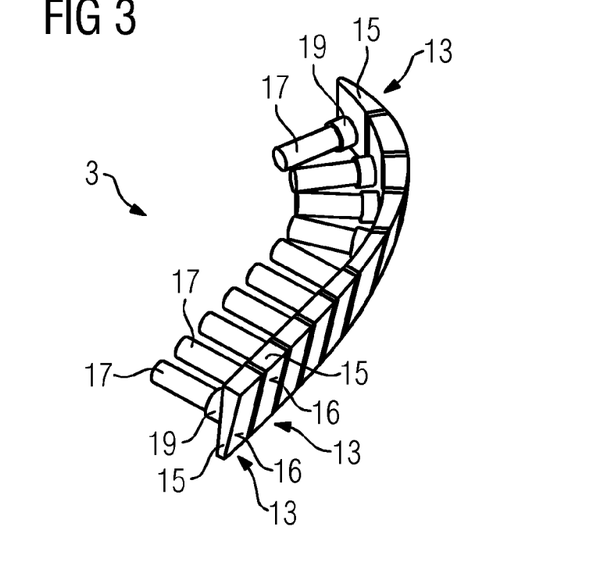
FIG. 3 shows clamping elements that are intended for the pressure side of a turbine blade.

The clamping structures 1, 3 are shown in detail in FIGS. 2 and 3. FIG. 2 shows the clamping structure 1, which is configured for pressing against the suction side 5, whereas FIG. 3 shows the clamping structure 3, which is configured for pressing against the pressure side 7. Both clamping structures are comprised of a plurality of clamping elements 13, which respectively have a clamping jaw 15 with a surface formed as a bearing surface 16 for bearing against the peripheral surface of the turbine blade. Furthermore, they have a shaft 17, which is located on the side of the clamping jaw 15 that is facing away from the bearing surface 16 and extends away from the clamping jaw 15. Each shaft 17 has a thickening 19 at its end adjacent the respective clamping jaw 15. Arranged on the inside of the shaft 17 or on the outside of the shaft 17 is a spring (cf. FIG. 4), which protrudes beyond the end of the shaft facing away from the clamping jaw 15.

As can be seen in FIG. 1, the device has two housings 21, 23, which respectively have a housing interior space 25, 27 that can be flowed through by a cooling fluid. Furthermore, the housings 21, 23 respectively have a cooling fluid inlet 29, 31 and a cooling fluid outlet 33, 35, which communicate with the respective housing interior 25, 27, so that a cooling fluid can be passed through the housing interior space 25, 27. Both liquids and gases come into consideration here as cooling fluids. Water is suitable in particular as a cooling liquid, since it is environmentally acceptable and generally available everywhere. However, other cooling liquids, such as for example oils or liquids specially designed as cooling liquids, also come into consideration in principle. Air is suitable in particular as a gaseous cooling fluid. However, gases with a higher thermal capacity, for instance triatomic gases such as carbon dioxide, may also be used. Which cooling fluid is actually used depends on a number of factors, for example the amount of heat introduced into the blade tip 11 during the welding, the temperature of the cooling fluid flowing in and the amount of fluid flowing through the housing interior 25, 27 per unit of time.

To be able to reliably remove the heat introduced into the tip of the main blade part, in the present exemplary embodiment the individual clamping jaws 13 of the clamping structures 1, 3 are pressed with a certain pressing pressure against the peripheral surface of the turbine blade, i.e. against the suction side 5 and the pressure side 7 by means of the springs 18 arranged in or on the shafts 17. It is also advantageous if the clamping elements 13 are comprised of a material that has a higher thermal conductivity than the material of the peripheral surface of the turbine blade 9. This avoids the removal of heat stalls when the bearing surfaces 16 by which the clamping jaws 15 make contact with the peripheral surface of the turbine blade 9 reach the same temperature as the peripheral surface 9.

The removal of the heat from the clamping elements 13 takes place by way of the cooling fluid flowing through the housing interior spaces 25, 27. In order to allow this, the clamping elements 13 protrude with their shafts 17 into the housing interior spaces 25, 27, so that cooling fluid flows around the shafts 17. The cooling fluid can thereby remove heat from the clamping elements 13. If an open cooling fluid circuit is used, the heat removed is dissipated into the surroundings together with the cooling fluid. However, there is also the possibility of using a closed cooling fluid circuit. Heat removal by means of a closed cooling fluid circuit is described more specifically later with reference to FIG. 4.

Figure 4:
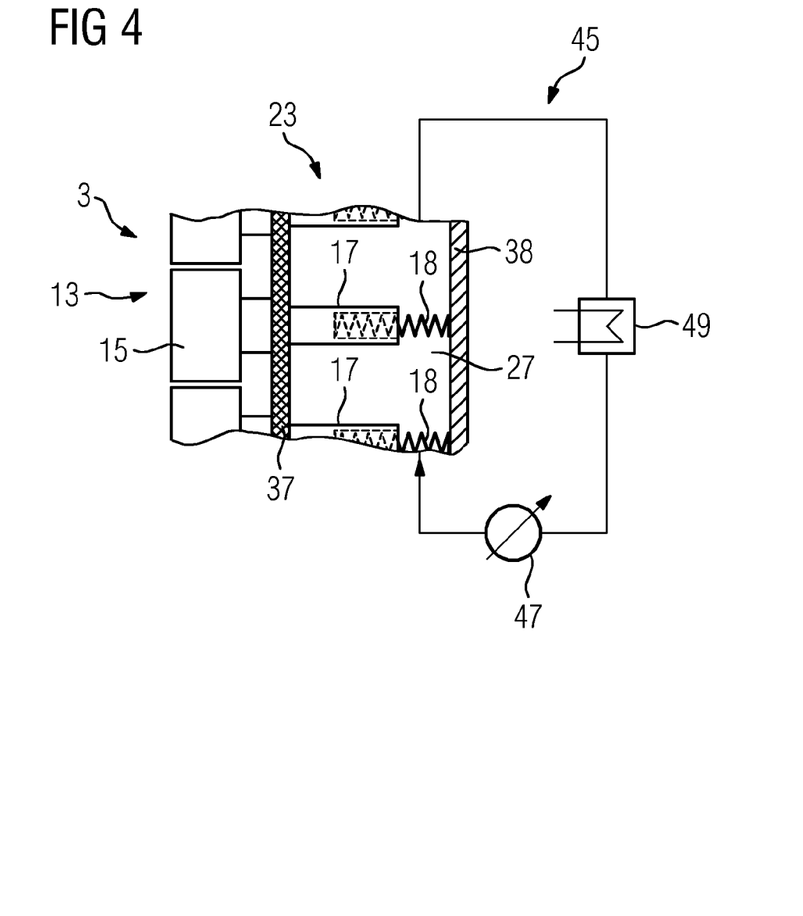
FIG. 4 shows a greatly schematized view of a detail of a variant of an embodiment of the device from FIG. 1.

FIG. 4 shows in a greatly schematized representation a detail of the device shown in FIG. 1. The detail shows part of the clamping structure 3. It is possible in particular to see a clamping element 13. Furthermore, a detail from the housing 23 with its housing interior space 27 can be seen. The housing is encapsulated against the penetration of metal powder during the build-up welding. Here there is on the side of the housing that is facing the main blade part an elastic membrane 37, which is connected in a form-fitting or material-bonding manner to the shafts 17 of the clamping elements 13 and thus divides each clamping element 13 into a portion protruding into the housing interior space 27 and a portion protruding from the housing interior space 27. In the present exemplary embodiment, the portion of the clamping element 13 protruding into the housing interior space 27 comprises the non-thickened portion of the shaft 17 and also the spring 18 and the portion protruding from the housing interior space 27 comprises the clamping jaw 15 and the thickened portion 19 of the shaft 17. The thickened region 19 serves as a spacer between the elastic membrane 37 and the clamping jaw 15. Other divisions between the portion arranged in the housing and the portion arranged outside the housing are possible, as long as all of the movable elements in the present exemplary embodiment the spring 18 are located in the encapsulated housing interior space 27.

The elastic membrane 37 is connected in a form-fitting or material-bonding manner not only to the shafts of the clamping elements 13 but also to the housing wall 38, so that the encapsulation of the housing 23 is achieved. In the present exemplary embodiment, a rubber membrane is used as the elastic membrane, but other elastic membranes that have a resistance to the welding atmosphere may also be used.

Apart from encapsulation, the elastic membrane 37 also serves in the present exemplary embodiment as a bearing for the clamping elements 13. On account of the elasticity of the membrane 37, the clamping elements 13 are mounted movably at least in one translational degree of freedom and two rotational degrees of freedom. In this way, they can adapt their orientation to the surface geometry of the peripheral surface of the turbine blade clamped at the time in question. The axes of rotation of the rotational degrees of freedom about which the rotation can take place in this adaptation extend here substantially in the tangential plane of the surface portion against which the respective clamping element is pressed. The pressing pressure for pressing the clamping elements 13 against the peripheral surface of the turbine blade 9 is applied by the springs 18, which in the present exemplary embodiment are formed as spiral springs. The springs 18 are mounted with their ends that are remote from the shafts 17 on the housing wall 38, so that a spring force acting between the clamping element 13 and the housing wall 37 is provided.

The mobility of the clamping elements in the degrees of freedom mentioned ensures that all of the clamping jaws 15 make contact with the peripheral surface of the turbine blade 9, even whenever the form of the peripheral surface deviates from the ideal form on account of tolerances or on account of operationally caused changes. The spiral springs 18 may therefore be regarded as a pressing device for applying the pressing pressure. It should be noted at this point that the arrangement shown in FIG. 4 and the form of the springs 41 shown in FIG. 4 merely represent one possible example of this. Instead of spiral springs, other forms of spring, for example leaf springs or cup springs, may also replace the spiral springs 18 in the arrangement shown. A different arrangement of the springs is also possible in principle. Thus, for example, there is the possibility of arranging the springs on the outer sides of the shafts 17. There is similarly the possibility of dispensing with springs entirely and instead using a drive as the pressing device for applying the pressing pressure. Such a drive may have for each clamping element 13 at least one dedicated actuator, which moves the respective clamping element 13 and is arranged in the housing interior space 27. Such actuators may be hydraulic, pneumatic or electromechanical. In the case of hydraulic actuators, for example, each clamping element 13 may be equipped with a hydraulic cylinder. The same also applies correspondingly to pneumatic actuators. Here, too, each clamping element may be equipped with a pneumatic cylinder. In the case of electromechanical actuators, there is for example the possibility of providing each clamping element 13 with an electric motor, in particular with a linear motor.

Figure 5:
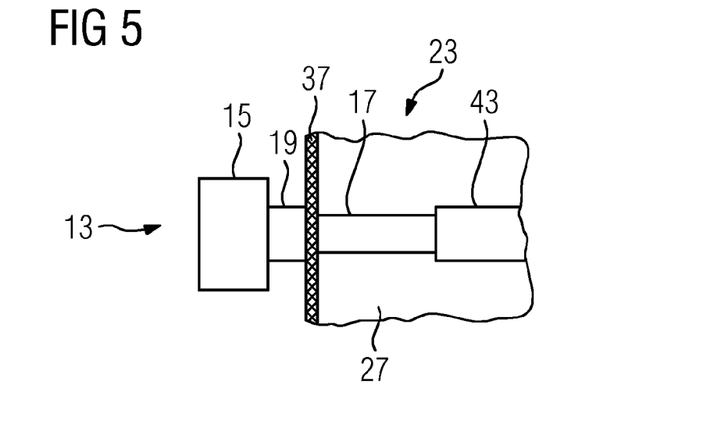
FIG. 5 shows a modification of the variant of an embodiment that is shown in FIG. 4.

Using a drive as a pressing device for applying a pressing pressure offers the possibility of individually controlling the pressing pressure of each clamping element 13, so that an individually defined pressing pressure is provided by each clamping element 13. For example, there is the possibility of performing the control in such a way that each clamping element 13 applies the same pressing pressure. However, there is also the possibility of adapting the pressing pressure that a clamping element 13 applies to the surface temperature of the turbine blade prevailing in the region of its clamping jaw 15. The removal of heat can be increased by more intimate contact of the surface, so that when there are heat gradients in the peripheral surface of the turbine blade, the heat removal can be locally distributed in such a way that the prevailing temperature gradient is equalized, or at least not increased. A clamping element 13 with a hydraulic cylinder 43 as an example of an actuator of a drive for the clamping element is schematically shown in FIG. 5.

The removal of heat in the case of a closed cooling circuit is described hereafter with reference to FIG. 4. The cooling circuit 45 passing through the housing interior 27 is schematically shown in this figure. It comprises a pump 47 or a compressor and, in the present exemplary embodiment, a heat exchanger 49, by way of which the heat can be given off to a secondary circuit or the surroundings (not shown). There is for example the possibility of providing a cooling element of a large surface area, for instance in the form of cooling ribs, in order to give off the heat located in the cooling circuit 45 to the surroundings. In principle, the clamping elements 13 may be connected by way of the cooling circuit to any suitable heat sink that extracts heat from the cooling fluid.

In the present exemplary embodiment, as already mentioned the turbine blade is clamped in the region of its blade tip 11 with the aid of the clamping structures 1, 3, in order to then repair it in the course of a build-up welding process. The clamping may be performed mechanically, hydraulically, pneumatically or by electromechanical means. In the present exemplary embodiment, two clamping spindles 51, 53 (see FIG. 1) are used. These respectively engage that side of the housings 21, 23 that lies opposite the clamping structure 1, 3. If a drive is used as the pressing device for applying a pressing pressure, it may also be used for applying the clamping force necessary for clamping the turbine blade. However, in this case there is also the possibility of using separate devices for applying the clamping force and for applying the pressing pressure.

Figure 6:
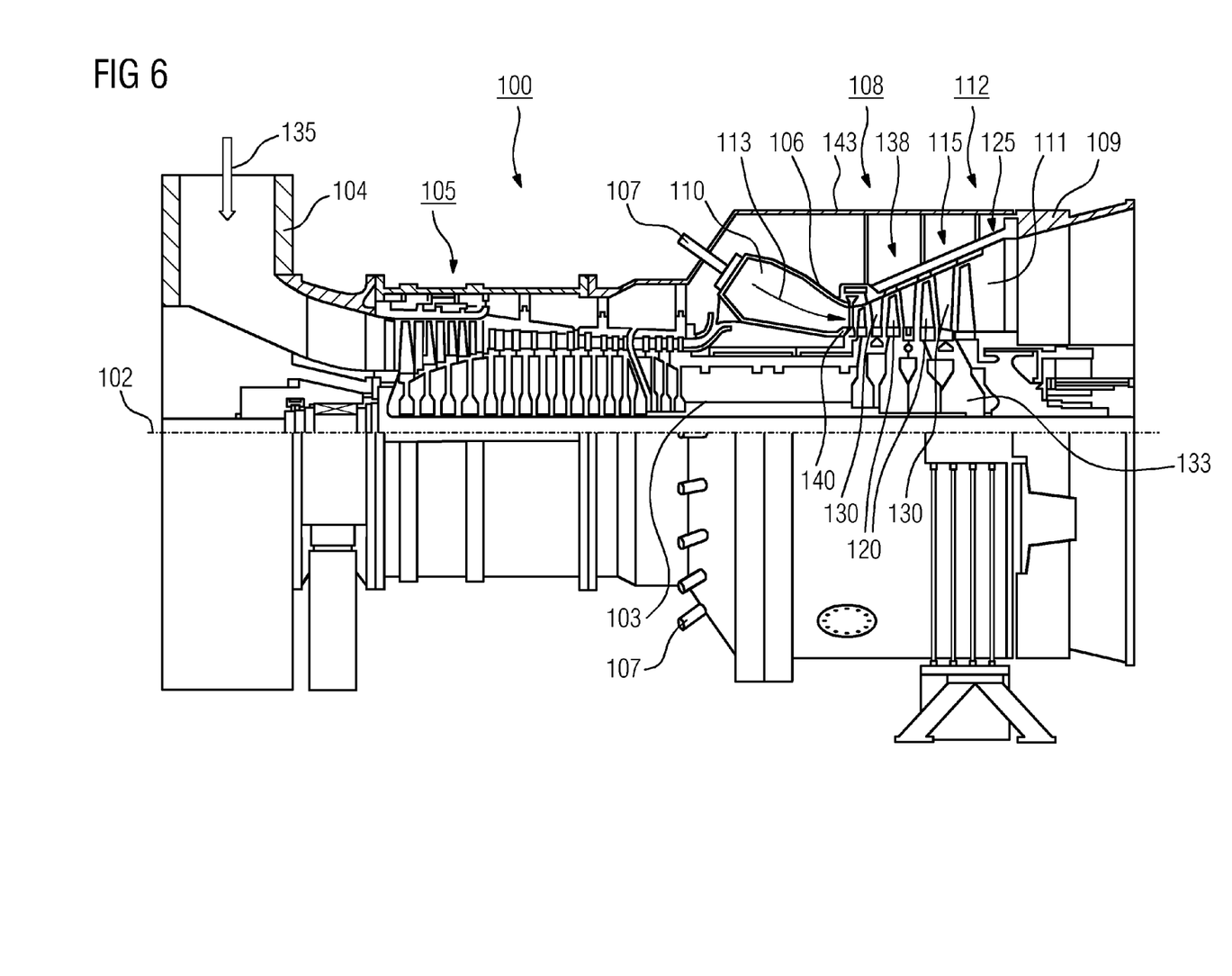
FIG. 6 shows, by way of example, a partial longitudinal section through a gas turbine.

FIG. 6 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot gas duct 111. There, for example four series-connected turbine stages 112 form the turbine 108. Each turbine stage 112 is formed, for example, from two blade rings. As seen in the direction of flow of a working medium 113, in the hot gas duct 111 a row of stationary blades 115 is followed by a row 125 formed from movable blades 120.

The stationary blades 130 are secured to an inner housing 138 of a stator 143, whereas the movable blades 120 of a row 125 are fitted to the rotor 103 for example by means of a turbine disk 133.

A generator (not shown) is coupled to the rotor 103. While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot gas duct 111 past the stationary blades 130 and the movable blades 120. The working medium 113 expands at the movable blades 120, imparting its momentum, so that the movable blades 120 drive the rotor 103 and the latter drives the generator coupled to it.

While the gas turbine 100 is operating, the components which are exposed to the hot working medium 113 are subject to thermal stresses. The stationary blades 130 and movable blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure). By way of example, iron-based, nickel-based or cobalt-based superalloys are used as material for the components, in particular for the turbine blade 120, 130 and components of the combustion chamber 110.

Superalloys of this type are known, for example, from EP 1 204 776 B1, EP 1 306 454, EP 1 319 729 A1, WO 99/67435 or WO 00/44949.

The blades 120, 130 may likewise have coatings protecting against corrosion (MCrAlX; M is at least one element selected from the group consisting of iron (Fe), cobalt (Co), nickel (Ni), X is an active element and stands for yttrium (Y) and/or silicon, scandium (Sc) and/or at least one rare earth element, or hafnium). Alloys of this type are known from EP 0 486 489 B1, EP 0 786 017 B1, EP 0 412 397 B1 or EP 1 306 454 A1.

It is also possible for a thermal barrier coating to be present on the MCrAlX, consisting for example of $ZrO_2$, $Y_2O_3$—$ZrO_2$, i.e. it is unstabilized, partially stabilized or fully stabilized by yttrium oxide and/or calcium oxide and/or magnesium oxide. Columnar grains are produced in the thermal barrier coating by suitable coating processes, such as for example electron beam physical vapor deposition (EB-PVD).

The stationary blade 130 has a stationary blade root (not shown here), which faces the inner housing 138 of the turbine 108, and a stationary blade head, which is at the opposite end from the stationary blade root. The stationary blade head faces the rotor 103 and is fixed to a securing ring 140 of the stator 143.

Figure 7:
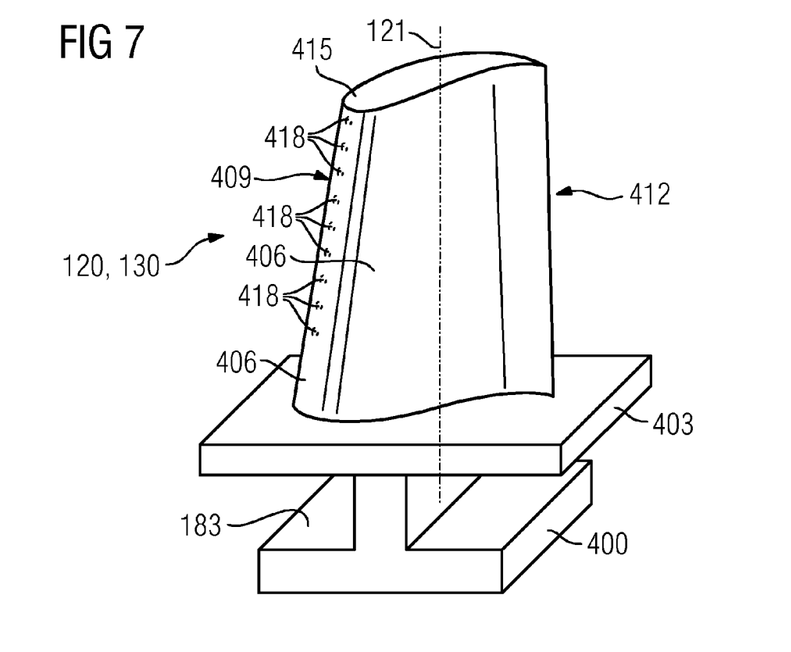
FIG. 7 shows in a perspective view a movable blade or stationary blade of a turbomachine.

FIG. 7 shows a perspective view of a movable blade 120 or stationary blade 130 of a turbomachine, which extends along a longitudinal axis 121.

The turbomachine may be a gas turbine of an aircraft or of a power plant for generating electricity, a steam turbine or a compressor.

The blade 120, 130 has, in succession along the longitudinal axis 121, a securing region 400, an adjoining blade platform 403 and a main blade part 406 and a blade tip 415.

As a stationary blade 130, the blade 130 may have a further platform (not shown) at its blade tip 415.

A blade root 183, which is used to secure the movable blades 120, 130 to a shaft or a disk (not shown), is formed in the securing region 400.

The blade root 183 is designed, for example, in hammerhead form. Other configurations, such as a fir-tree or dovetail root, are possible.

The blade 120, 130 has a leading edge 409 and a trailing edge 412 for a medium which flows past the main blade part 406. In the case of conventional blades 120, 130, by way of example solid metallic materials, in particular superalloys, are used in all regions 400, 403, 406 of the blade 120, 130.

Superalloys of this type are known, for example, from EP 1 204 776 B1, EP 1 306 454, EP 1 319 729 A1, WO 99/67435 or WO 00/44949.

The blade 120, 130 may in this case be produced by a casting process, by means of directional solidification, by a forging process, by a milling process or combinations thereof. Workpieces with a single-crystal structure or structures are used as components for machines which, in operation, are exposed to high mechanical, thermal and/or chemical stresses. Single-crystal workpieces of this type are produced, for example, by directional solidification from the melt. This involves casting processes in which the liquid metallic alloy solidifies to form the single-crystal structure, i.e. the single-crystal workpiece, or solidifies directionally. In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades 120, 130 may likewise have coatings protecting against corrosion or oxidation, e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1.

The density is preferably 95% of the theoretical density. A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. it is unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that, after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade 120, 130 may be hollow or solid in form. If the blade 120, 130 is to be cooled, it is hollow and may also have film-cooling holes 418 (indicated by dashed lines).

Figure 8:
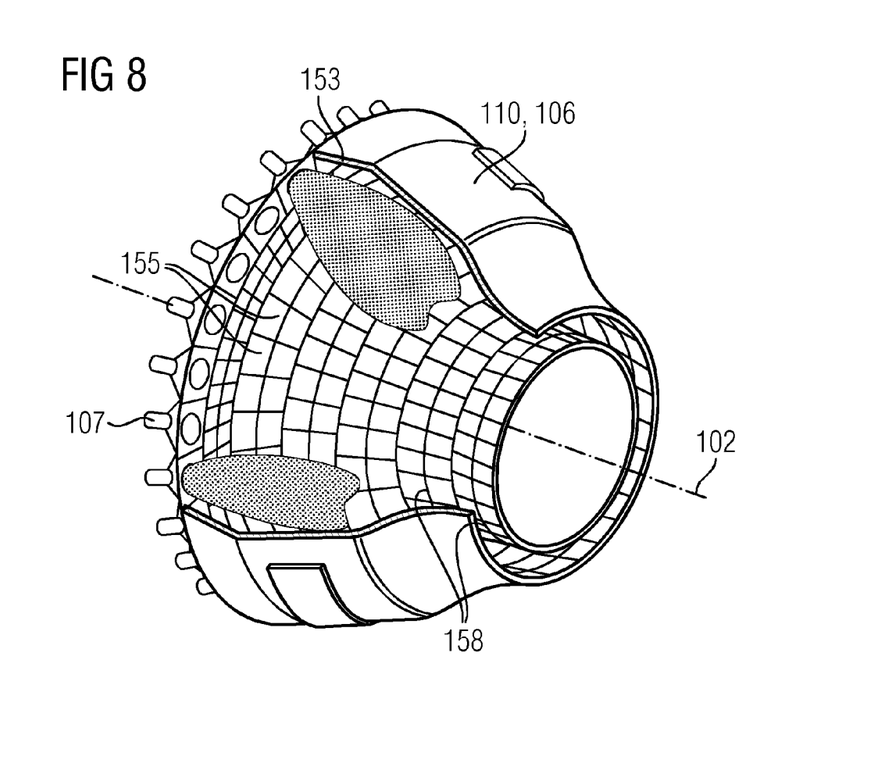
FIG. 8 shows a gas turbine combustion chamber.

FIG. 8 shows a combustion chamber 110 of a gas turbine. The combustion chamber 110 is configured, for example, as what is known as an annular combustion chamber, in which a multiplicity of burners 107, which generate flames 156, arranged circumferentially around an axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1.

It is also possible for a, for example, ceramic thermal barrier coating to be present on the MCrAlX, consisting for example of $ZrO_2$, $Y_2O_3$—$ZrO_2$, i.e. it is unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that, after they have been used, protective layers may have to be removed from heat shield elements 155 (e.g. by sand-blasting). Then, the corrosion and/or oxidation layers and products are removed. If appropriate, cracks in the heat shield element 155 are also repaired. This is followed by recoating of the heat shield elements 155, after which the heat shield elements 155 can be reused.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

The present invention has been described in more detail on the basis of a specific exemplary embodiment for explanatory purposes. Since, as already mentioned in the text, modifications of this specific exemplary embodiment are possible, the invention should not be restricted to this exemplary embodiment, but only by the appended claims.

The invention claimed is:

1. A device for clamping a turbine blade, wherein:
the blade includes a peripheral surface having a suction side and a pressure side and a blade tip;
the device is configured and operable for clamping the blade during a welding repair of the blade tip;
the device comprises at least one movable clamping structure configured and operable for pressing against the suction side or against the pressure side of the turbine blade in a region of the blade tip, the clamping structure being so configured and of such material for transferring heat from the turbine blade;
the at least one movable clamping structure comprises a plurality of clamping elements, which are spaced apart and are respectively mounted on the clamping structure in an individually movable manner, in which each clamping element is movable at least in directions toward and away from the peripheral surface of the turbine blade to clamp the turbine blade; and
an elastic membrane is connected to a shaft of each clamping element, the elasticity of the elastic membrane resulting in each clamping element being mounted movably to have at least two rotational degrees of freedom about axes of rotation which extend in a tangential plane of a surface portion of the turbine blade against which the respective clamping element is pressed.

2. The device as claimed in claim 1, further comprising a pressing device located, configured and operable for applying a pressure for pressing the at least one movable clamping structure against the peripheral surface of the turbine blade.

3. The device as claimed in claim 2, wherein the pressing device for applying the pressure comprises at least one spring located and operable for acting on the clamping elements for applying pressure on the clamping elements.

4. The device as claimed in claim 2, wherein the pressing device for applying the pressure comprises a drive configured for acting on the clamping elements.

5. The device as claimed in claim 4, wherein the drive comprises a respective drive for each clamping element and having a respective dedicated actuator for moving the corresponding clamping element with respect to the peripheral surface of the blade.

6. The device as claimed in claim 5, wherein the respective drive is a hydraulic drive or a pneumatic drive, wherein each clamping element is assigned a dedicated hydraulic or pneumatic actuator for acting on the clamping element.

7. The device as claimed in claim 5, wherein the respective drive is an electrical drive, and each clamping element is assigned a dedicated electromechanical actuator for acting on the clamping element.

8. The device as claimed in claim 1, wherein each of the clamping elements is comprised of a material having a first thermal conductivity greater than a second thermal conductivity of a material of which the peripheral surface of the turbine blade is comprised.

9. The device as claimed in claim 1, wherein:
a first one of the clamping structures is located and configured for pressing against the suction side of the peripheral surface of the blade;
a second one of the clamping structures is located and configured for pressing against the pressure side of the peripheral surface; and
each of the movable clamping structures has a plurality of the clamping elements.

10. A device for clamping a turbine blade, wherein:
the blade includes a peripheral surface having a suction side and a pressure side and a blade tip;
the device is configured and operable for clamping the blade during a welding repair of the blade tip;
the device comprises at least one movable clamping structure configured and operable for pressing against the suction side or against the pressure side of the turbine blade in a region of the blade tip, the clamping structure being so configured and of such material for transferring heat from the turbine blade;
the at least one movable clamping structure comprises a plurality of clamping elements, which are spaced apart and are respectively mounted on the clamping structure in an individually movable manner, in which each clamping element is movable at least in directions toward and away from the peripheral surface of the turbine blade to clamp the turbine blade;
an elastic membrane is connected to a shaft of each clamping element, the elasticity of the elastic membrane resulting in each clamping element being mounted movably to have at least two rotational degrees of freedom; and
the device further comprises a heat sink to which each of the clamping elements is connected in a manner to transfer heat from the clamping elements to the heat sink.

11. A device for clamping a turbine blade, wherein:
the blade includes a peripheral surface having a suction side and a pressure side and a blade tip;
the device is configured and operable for clamping the blade during a welding repair of the blade tip;
the device comprises at least one movable clamping structure configured and operable for pressing against the suction side or against the pressure side of the turbine blade in a region of the blade tip, the clamping structure being so configured and of such material for transferring heat from the turbine blade;
the at least one movable clamping structure comprises a plurality of clamping elements, which are spaced apart and are respectively mounted on the clamping structure in an individually movable manner, in which each clamping element is movable at least in directions toward and away from the peripheral surface of the turbine blade to clamp the turbine blade;
an elastic membrane is connected to a shaft of each clamping element, the elasticity of the elastic membrane resulting in each clamping element being mounted movably to have at least two rotational degrees of freedom;
the device further comprises at least one housing having a housing interior space configured for passing through it a cooling fluid, a cooling fluid inlet and a cooling fluid outlet in the housing connected to the interior space; and
each clamping element has a first respective portion protruding from the housing interior space in a direction toward the blade tip and a second portion protruding into the housing interior space.

12. The device as claimed in claim 11, further comprising a cooling fluid circuit leading through the housing interior space and connected to a heat sink.

13. The device as claimed in claim 11, further comprising an elastic membrane encapsulating the housing interior space in the direction of the turbine blade, the membrane being fixedly connected to each of the clamping elements; wherein
the clamping elements have movable parts located in the second portion of each clamping element that protrudes into the housing interior space.

* * * * *